US012025934B2

(12) United States Patent
Yoshikawa

(10) Patent No.: US 12,025,934 B2
(45) Date of Patent: Jul. 2, 2024

(54) FIXING DEVICE AND IMAGE FORMING DEVICE

(71) Applicant: SHARP KABUSHIKI KAISHA, Sakai (JP)

(72) Inventor: Kouta Yoshikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/099,144

(22) Filed: Jan. 19, 2023

(65) Prior Publication Data

US 2023/0251594 A1 Aug. 10, 2023

(30) Foreign Application Priority Data

Feb. 4, 2022 (JP) ................................ 2022-016367

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ................................................ G03G 15/2053
See application file for complete search history.

(56) References Cited

U.S. PATENT DOCUMENTS

2017/0261900 A1* 9/2017 Sawada ................ G03G 15/206
2018/0364625 A1* 12/2018 Yagi .................. G03G 15/2053

FOREIGN PATENT DOCUMENTS

JP 2020-118765 A 8/2020

* cited by examiner

*Primary Examiner* — Sevan A Aydin
(74) *Attorney, Agent, or Firm* — ScienBiziP, P.C.

(57) ABSTRACT

The fixing device includes: a fixing belt that is heated by a heater lamp; a pressure roller that makes contact with the fixing belt; a fixing pad that sandwiches the fixing belt from the inner side of the fixing belt and is arranged opposing the pressure roller, and which forms a nip portion between the fixing belt and the pressure roller; a sliding sheet provided between the fixing pad and the fixing belt, which reduces the frictional force with the fixing belt; and a pad heat transfer plate provided between the sliding sheet and the fixing pad, which adjusts the heat transfer in a longitudinal direction of the fixing belt. The fixing pad has protrusions and that make contact with the pad heat transfer plate, and forms a gap between the fixing pad and the pad heat transfer plate in a location where the protrusions and are not making contact.

4 Claims, 10 Drawing Sheets

FIXING DEVICE AND IMAGE FORMING DEVICE

BACKGROUND OF THE INVENTION

Field of the Invention

The present disclosure relates to a fixing device and an image forming device.

Description of the Background Art

In a conventional fixing device, the fixing device is provided with a fixing pad that presses against a belt from the inner side, a sliding sheet that is arranged between the belt and the fixing pad, a support member that supports the belt from the opposite side to the fixing pad, and a roller. A fixing device is known in which the roller and the fixing pad sandwich the sliding sheet and the belt, and the fixing pad has a plurality of recesses on the surface on the roller side.

FIG. 8 is a diagram showing enlarged the specific configuration of a contact portion between a fixing belt 31, a pressure roller 32, and a fixing pad 34 in a conventional fixing device, and is a diagram showing the contact state between a pad heat transfer plate 33 and the fixing pad 34 inside the fixing belt 31. Referring to FIG. 8, conventionally, the pad heat transfer plate 33 is in close contact with the fixing pad 34 on the inside of the fixing belt 31. The heat provided by a heater lamp 36 is transmitted to a nip portion formed between the fixing belt 31 and the pressure roller 32 via the pad heat transfer plate 33 provided on the fixing pad 34, and a sliding sheet 35.

The fixing device of a conventional image forming device is configured as described above. The fixing pad 34 is formed so as to press against the sliding sheet 35, which results in a structure in which recesses appear at the surface of the sliding sheet 35. Therefore, because the fixing pressure is not uniform, there is a problem that the image quality is affected. Furthermore, because the heat provided by the heater lamp 36 is in close contact with the pad heat transfer plate 33 provided on the fixing pad 34, an unnecessary amount of heat is lost from the pad heat transfer plate 33 to the fixing pad 34, and there is a problem that the power consumption increases.

The present disclosure has been made to solve the problems described above. An object of the present disclosure is to provide a fixing device and an image forming device that are capable of suppressing and adjusting the amount of heat transferred from a pad heat transfer plate to a fixing pad without affecting the image quality, and enable the power consumption to be reduced.

SUMMARY OF THE INVENTION

A fixing device comprising according to the present disclosure includes: a heating rotator (fixing belt) that is heated by a heat source; a pressure rotator (pressure roller) that makes contact with the heating rotator; a pad member (fixing pad) that sandwiches the heating rotator from an inner side of the heating rotator and is arranged opposing the pressure rotator, and which forms a nip portion between the heating rotator and the pressure rotator for holding and transporting a paper sheet; a sliding member (sliding sheet) provided between the pad member and the heating rotator, which reduces a frictional force with the heating rotator; and a heat transfer member (pad heat transfer plate) provided between the sliding member and the pad member, which adjusts a heat transfer in a longitudinal direction of the heating rotator; wherein the pad member is provided with protrusions that make contact with the heat transfer member, and a gap is formed between the pad member and the heat transfer member in a location where the protrusions are not making contact.

It is preferable that the protrusions are formed in a longitudinal direction of the pad member with a shape along the heat transfer member, and the gap is also formed in the longitudinal direction of the pad member.

It is more preferable that, inside the gap, a plurality of protrusions are provided on the pad member, and the plurality of protrusions do not make contact between the pad member and the heat transfer member.

The protrusions may be provided on an outer periphery of the pad member, and a width of the protrusion arranged across a short-length direction of the pad member may be wider than a width of the protrusion arranged across a longitudinal direction of the pad member.

According to another aspect of the present disclosure, an image forming device includes any one of the fixing devices described above.

According to the present disclosure, because the pad member and the heat transfer member only make contact at the protrusions, and a gap is formed between the pad member and the heat transfer member except at the protrusions, it is possible to suppress and adjust the amount of heat transferred from the heat transfer member (pad heat transfer plate) to the pad member (fixing pad) without affecting the image quality. As a result, it is possible to provide a fixing device and an image forming device that are capable of reducing the power consumption without affecting the image quality.

The above-described object, other objects, features, and advantages of the present disclosure will become more apparent from the detailed description of the following embodiments given with reference to the drawings.

DESCRIPTION OF THE PREFERRED EMBODIMENTS

Figure 1:
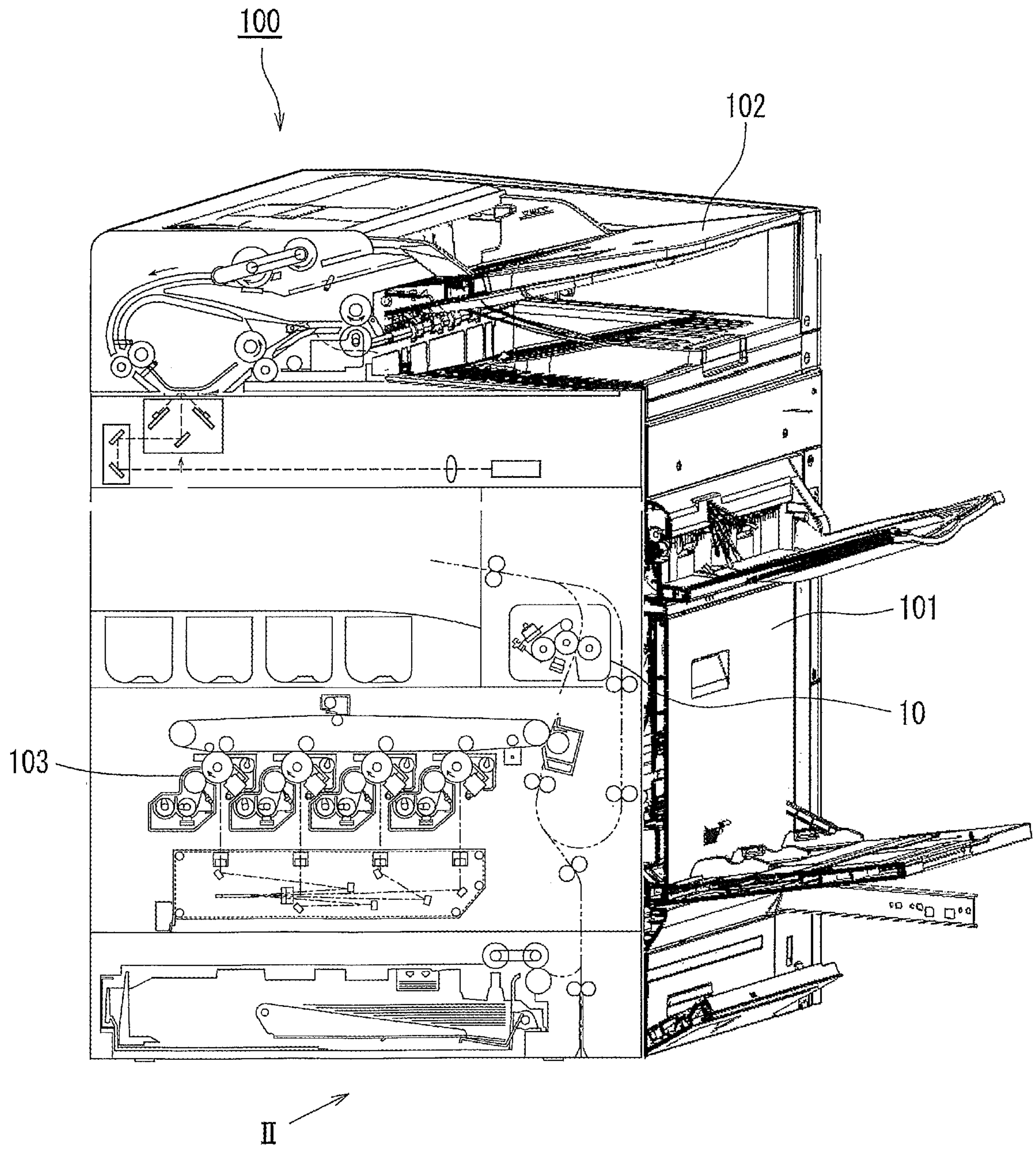
FIG. 1 is a perspective view of an image forming device provided with a fixing device according to an embodiment of the present disclosure.

An embodiment of the present disclosure will be described below in detail with reference to the drawings. FIG. 1 is a perspective view of an image forming device 100 provided with a fixing device according to an embodiment of the present disclosure. Referring to FIG. 1, the image forming device 100 is, for example, a multifunction peripheral having a copy function, a printer function, a scanner function, a facsimile function, and the like. The image forming device 100 includes a device body 101, and an image reading device 102 arranged above the device body 101. The device body 101 incorporates components such as a controller (not shown) that includes a CPU, a RAM, an HDD, and the like, an image former 103, and a fixing device 10. The controller transmits control signals to each part of the image forming device 100, including the fixing device 10, according to input operations made by the user with respect to an operation unit (not shown), and causes the image forming device 100 to execute various operations.

First Embodiment

Figure 2:
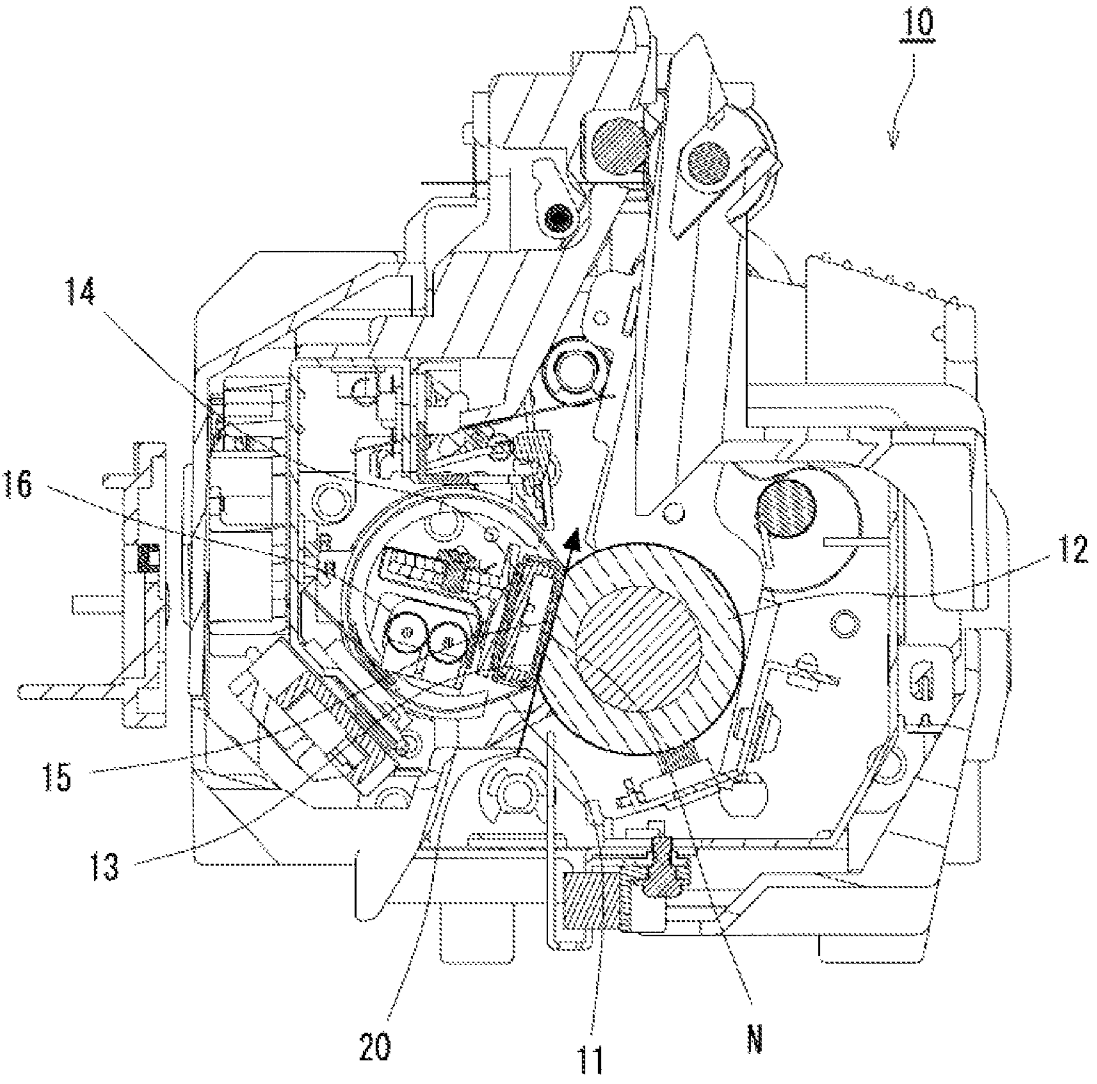
FIG. 2 is an enlarged cross-sectional view of the fixing device viewed from the direction indicated by arrow II in the image forming device shown in FIG. 1.

Next, the fixing device 10 will be described. FIG. 2 is an enlarged cross-sectional view of the fixing device 10 viewed from the direction indicated by arrow II in the fixing device 10 of the image forming device 100 shown in FIG. 1. Referring to FIG. 2, the fixing device 10 includes a fixing belt (heating rotator) 11, a pressure roller (pressure rotator) 12, and the like. A sheet of paper (not shown) is transported to a nip portion N formed by the fixing belt 11 and the pressure roller 12 in the direction indicated by arrow 20 in the diagram. Inside the fixing belt 11, a fixing pad (pad member) 14, a pad heat transfer plate (heat transfer member (Cu plate)) 13 provided on the fixing pad 14, a sliding sheet (sliding member) 15 provided between the pad heat transfer plate 13 and the fixing belt 11, a heater lamp 16 serving as a heat source, and the like, are provided. Further, the fixing belt 11 is heated to a predetermined fixing temperature (such as 170° C.) by the heater lamp 16. Furthermore, the pressure roller 12 is provided so as to press the fixing belt 11 against the fixing pad 14. When a sheet of paper passes through the nip portion N between the pressure roller 12 and the fixing belt 11, a toner image transferred to the sheet of paper is melted, mixed, and pressed, and the toner image is thermally fixed to the sheet of paper.

Here, the sliding sheet 15 is provided to reduce the sliding frictional resistance of the fixing belt 11.

Figure 3:
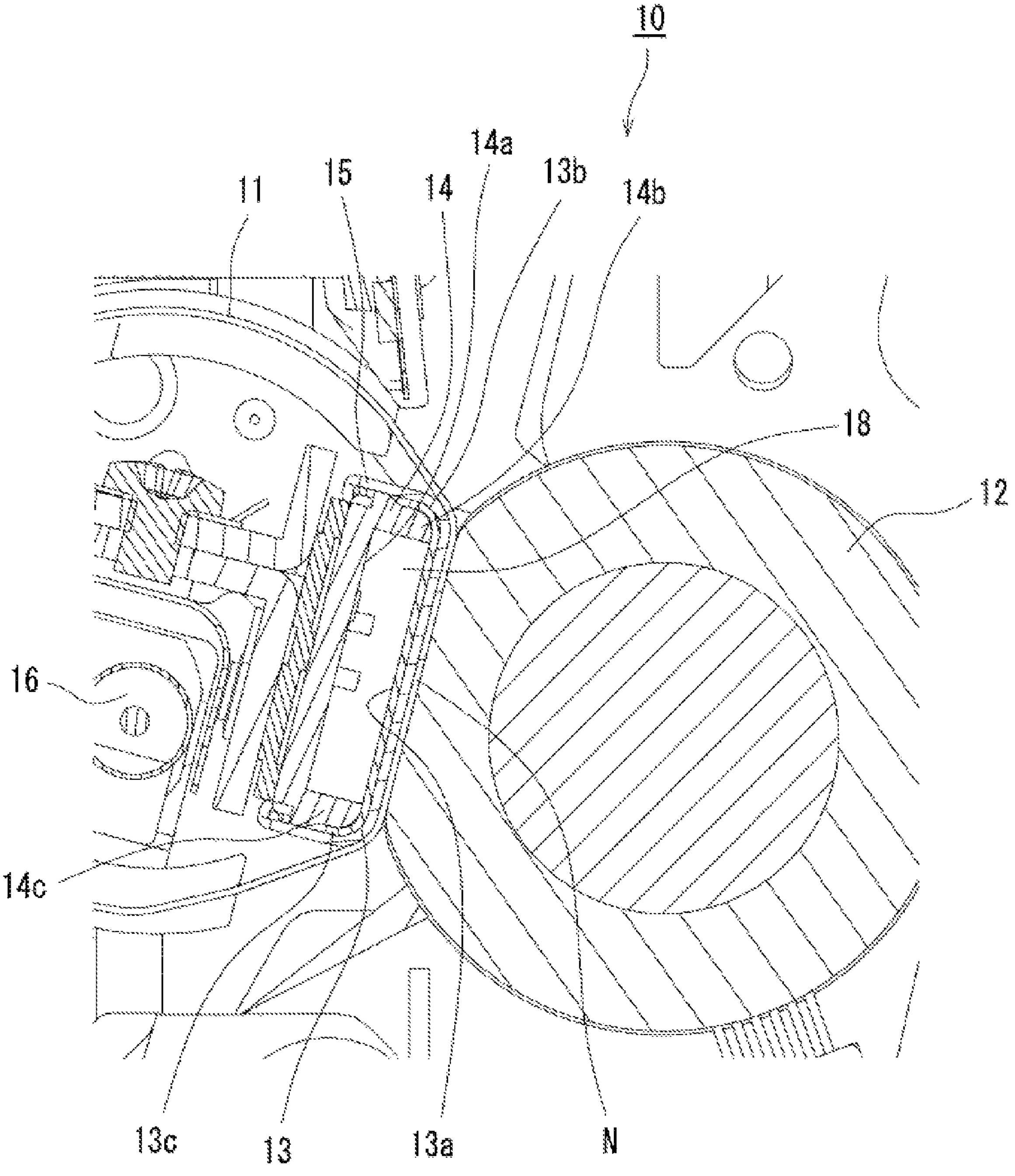
FIG. 3 is an enlarged cross-sectional view showing the configuration near a fixing pad of the fixing device.
Figure 8:
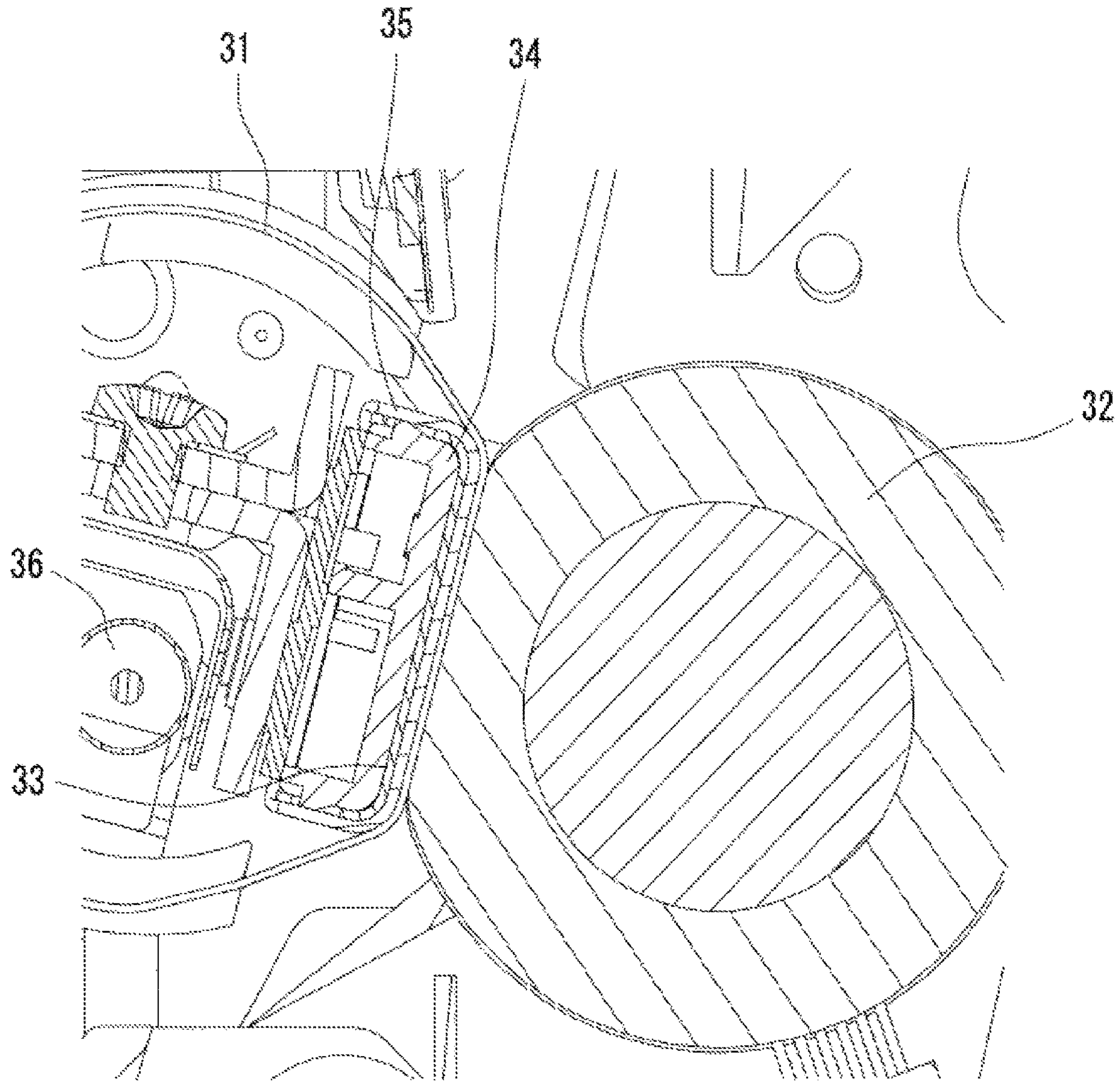
FIG. 8 (Prior Art)
FIG. 8 is an enlarged view of a specific configuration of a contact portion between a fixing belt, a pressure roller, and a fixing pad of a conventional fixing device.

Next, the configuration near the fixing pad 14 of the fixing device 10 will be described. FIG. 3 is an enlarged cross-sectional view showing the configuration near the fixing pad 14 of the fixing device 10 shown in FIG. 2, and is a diagram that corresponds to FIG. 8 showing the conventional configuration.

Referring to FIG. 3, in the present embodiment, the fixing pad 14 is a member having a letter-C shaped cross-section, and includes a surface 14*a* parallel to the nip portion N, and opposing protrusions 14*b* and 14*c* that protrude perpendicularly from the upper end and lower end of the surface 14*a*. Further, in the drawing, the fixing pad 14 is a member that extends in the longitudinal direction, which is perpendicular to the plane of the paper. The pad heat transfer plate 13, which has a reverse letter-C shaped cross-section, and includes a surface 13*a* parallel to the nip portion N, and opposing protrusions 13*b* and 13*c* at the upper end and lower end of the surface 13*a* that protrude perpendicularly from the surface 13*a* to the left side, is provided so as to cover the upper and lower ends of the protrusions 14*b* and 14*c* on the right side of the fixing pad 14.

In the present embodiment, the fixing pad 14 and the pad heat transfer plate 13 are configured to only make contact at the ends of the protrusions 14*b* and 14*c*, which are at the top and bottom on the right side of the fixing pad 14. In addition, a gap 18 is formed between the mutually parallel surfaces of the fixing pad 14 and the pad heat transfer plate 13.

According to the present embodiment, the fixing pad 14 and the pad heat transfer plate 13 make contact at only the protrusions 14*b* and 14*c*. Further, because there is a gap between the fixing pad 14 and the pad heat transfer plate 13 except at the protrusions 14*b* and 14*c*, it is possible to suppress the amount of heat that is transferred from the pad heat transfer plate 13 to the fixing pad 14 without affecting the image quality, and unnecessary heat transfer can be suppressed.

Furthermore, the sliding sheet 15 is provided on the pad heat transfer plate 13, and the fixing belt 11 slides thereon. Because the pad heat transfer plate 13 formed of a copper (Cu) plate presses against the sliding sheet 15, the fixing pressure is configured uniformly irrespective of the shape of the fixing pad 14.

Figure 4A:
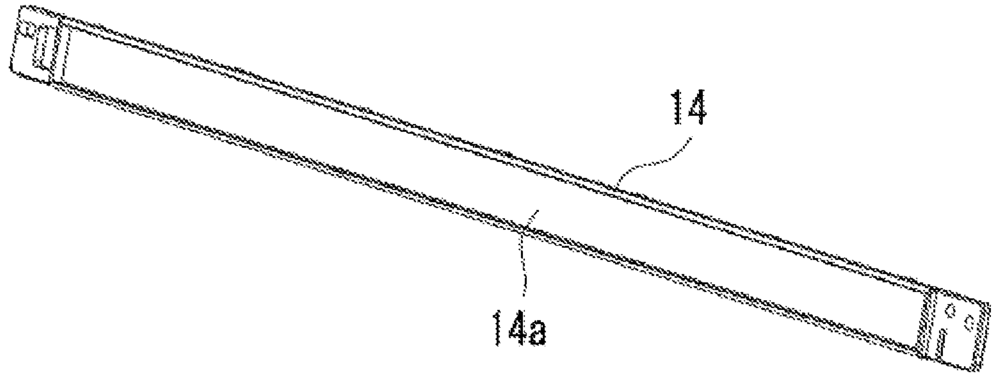
FIG. 4A is a perspective view of a fixing pad according to an embodiment of the present disclosure.
Figure 4B:
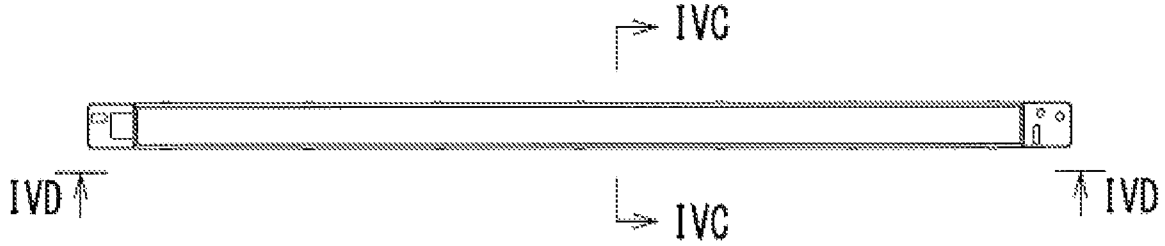
FIG. 4B is a front view of the fixing pad according to an embodiment of the present disclosure viewed from a nip portion N side.
Figure 4C:
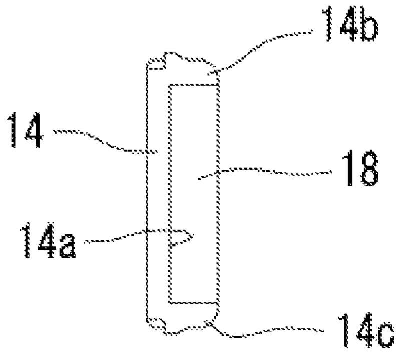
FIG. 4C is a cross-sectional view of the portion indicated by arrow IVC-IVC in FIG. 4B.
Figure 4D:
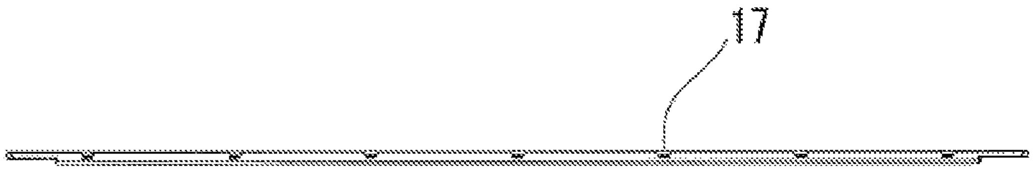
FIG. 4D is a side view of the portion indicated by arrow IVD-IVD in FIG. 4B.

FIG. 4A is a perspective view of the fixing pad 14 according to the present embodiment. FIG. 4B is a front view of the fixing pad 14 viewed from the nip portion N side. FIG. 4C is a cross-sectional view of the portion indicated by arrow IVC-IVC in FIG. 4B. FIG. 4D is a side view of the portion indicated by arrow IVD-IVD in FIG. 4B. Referring to FIG. 4A to FIG. 4D, the fixing pad 14 according to the present embodiment is, as described above, a member having a letter-C shaped cross-section that extends in the longitudinal direction. Further, it includes the surface 14*a*, which is parallel to the nip portion N, and the protrusions 14*b* and 14*c* that perpendicularly protrude with the same lengths from the surface 14*a* at the upper and lower ends of the surface 14*a*. In addition, the gap 18 is provided between the protrusions 14*b* and 14*c*, which protrude parallel to each other.

Moreover, the outside of the protrusions 14*b* and 14*c* is provided with projections 17 for securing the pad heat transfer plate 13.

As described above, in the present embodiment, protrusions that make contact with the pad heat transfer plate 13 are provided only at the upper and lower ends of the fixing pad 14 in the longitudinal direction, and the gap 18 is provided at the center. As a result, the contact area between the pad heat transfer plate 13 and the fixing pad 14 is reduced, which enables unnecessary heat transfer to be suppressed.

Second Embodiment

Figure 5:
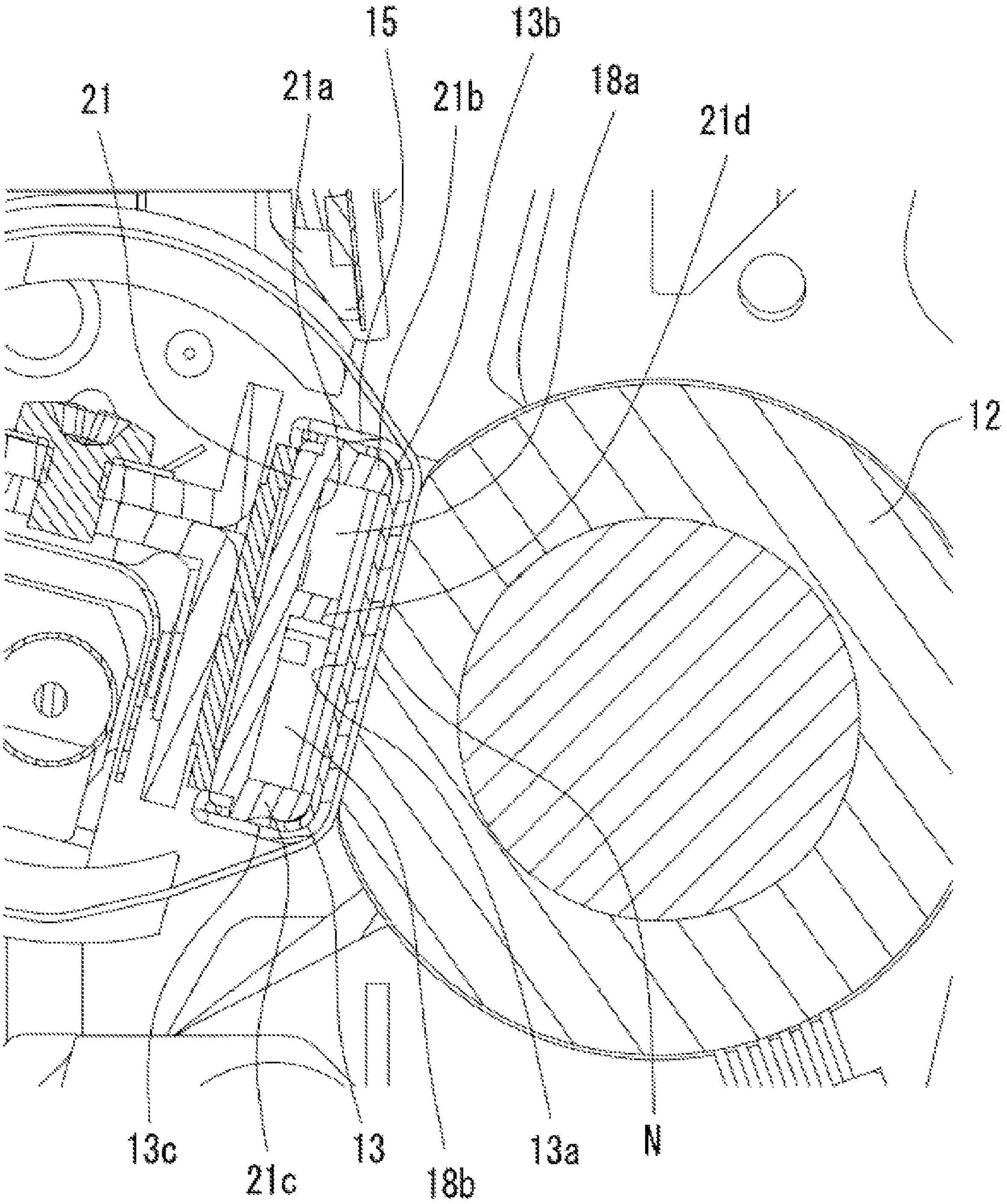
FIG. 5 is an enlarged cross-sectional view showing the configuration near a fixing pad of a fixing device according to another embodiment of the present disclosure.

Next, another embodiment of the present disclosure will be described. FIG. 5 is an enlarged cross-sectional view showing the configuration near a fixing pad 21 of a fixing device 10 according to another embodiment of the present disclosure, and is a diagram that corresponds to FIG. 3 of the previous embodiment. Referring to FIG. 5, in the present embodiment, the fixing pad 21 is a member having a letter-E shaped cross-section, and includes a surface 21*a* parallel to the nip portion N, and protrusions 21*b*, 21*c* and 21*d* that protrude perpendicularly from the parallel surface 21*a* from the center, upper end, and lower end of the surface 21*a*. Further, in the drawing, the fixing pad 21 is a member that extends in the longitudinal direction, which is perpendicular to the plane of the paper. The pad heat transfer plate 13, which has a reverse letter-C shaped cross-section, and includes a surface 13*a* parallel to the nip portion N, and opposing protrusions 13*b* and 13*c* at the upper end and lower end of the surface 13*a* that protrude perpendicularly from the parallel surface 13*a* to the left side, and the sliding sheet 15 are provided so as to cover the upper and lower ends of the protrusions 21*b* and 21*c* on the right side of the fixing pad 21.

In the present embodiment, the fixing pad 21 and the pad heat transfer plate 13 are configured to only make contact at the ends of the protrusions 21*b* and 21*c*, which are at the top and bottom on the right side of the fixing pad 21. In addition, the center protrusion 21*d* does not make contact with the pad heat transfer plate 13 located on the right side. As a result, gaps 18*a* and 18*b* are formed so as to sandwich the protrusion 21*d* between the mutually parallel surfaces of the surface 21*a* of the fixing pad 21 and the pad heat transfer plate 13.

Furthermore, like the previous embodiment, the sliding sheet 15 is provided on the pad heat transfer plate 13, and the fixing belt 11 is provided thereon.

Figure 6A:
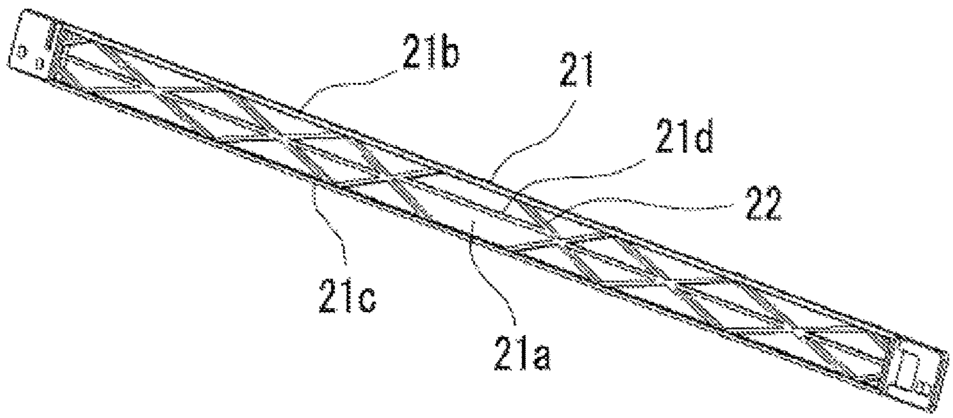
FIG. 6A is a perspective view of a fixing pad according to another embodiment of the present disclosure.
Figure 6B:
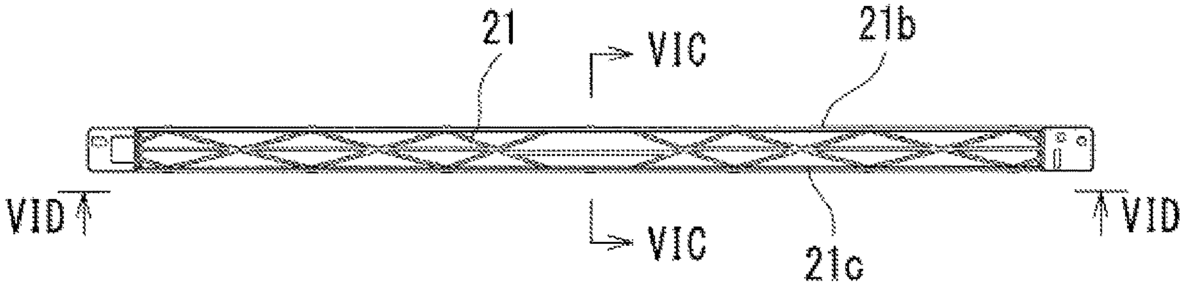
FIG. 6B is a front view of the fixing pad according to another embodiment of the present disclosure viewed from the nip portion N side.
Figure 6C:
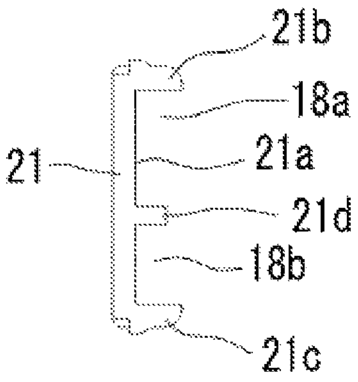
FIG. 6C is a cross-sectional view of the portion indicated by arrow VIC-VIC in FIG. 6B.
Figure 6D:
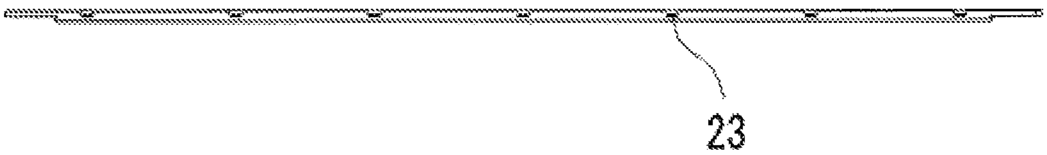
FIG. 6D is a side view of the portion indicated by arrow VID-VID in FIG. 6B.

FIG. 6A to FIG. 6D are diagrams that describe the fixing pad 21 according to the present embodiment in detail. FIG. 6A is a perspective view of the fixing pad 21 according to the present embodiment. FIG. 6B is a front view of the fixing pad 21 viewed from the nip portion N side. FIG. 6C is a cross-sectional view of the portion indicated by arrow VIC-VIC in FIG. 6B. FIG. 6D is a side view of the portion indicated by arrow VID-VID in FIG. 6B. Referring to FIG. 6A to FIG. 6D, the fixing pad 21 according to the present embodiment is, as described above, a member having a letter-E shaped cross-section that extends in the longitudinal direction. Further, it includes the protrusions 21*d*, 21*b* and 21*c* that perpendicularly protrude from the surface 21*a* at the center and the upper and lower ends of the central surface 21*a*. The gaps 18*a* and 18*b* are provided between the protrusions 21*b* and 21*c* so as to sandwich the protrusion 21*d*.

In the present embodiment, unlike the previous embodiment, a plurality of ribs 22 that extend in a diagonal direction and connect each of the protrusions 21*b*, 21*c* and 21*d* are provided between the protrusions 21*b*, 21*c* and 21*d* that extend in the longitudinal direction of the fixing pad 21. The ribs 22 act as reinforcing members. The height of the ribs 22 is the same as the height of the protrusion 21*d*, and they do not make contact with the opposing pad heat transfer plate 13.

As a result of the ribs 22, which take the form of various projections, problems relating to the molding of the fixing pad 14 (such as warpage and the resin fluidity) are improved. Meanwhile, the contact area between the pad heat transfer plate 13 and the fixing pad 14 is also reduced, which suppresses unnecessary heat transfer. Furthermore, the outside of the protrusions 21*b* and 21*c* is provided with projections 23 for securing the pad heat transfer plate 13.

Third Embodiment

Figure 7A:
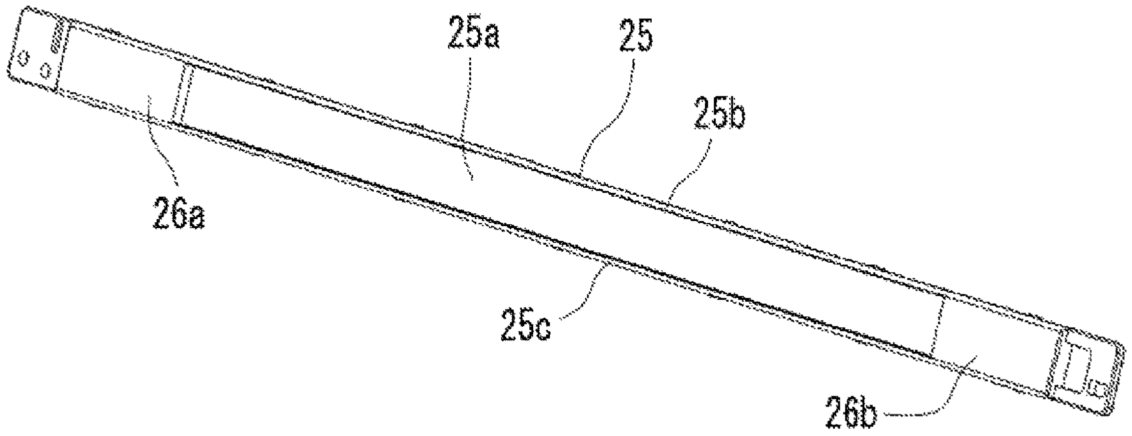
FIG. 7A is a perspective view of a fixing pad according to yet another embodiment of the present disclosure.
Figure 7B:
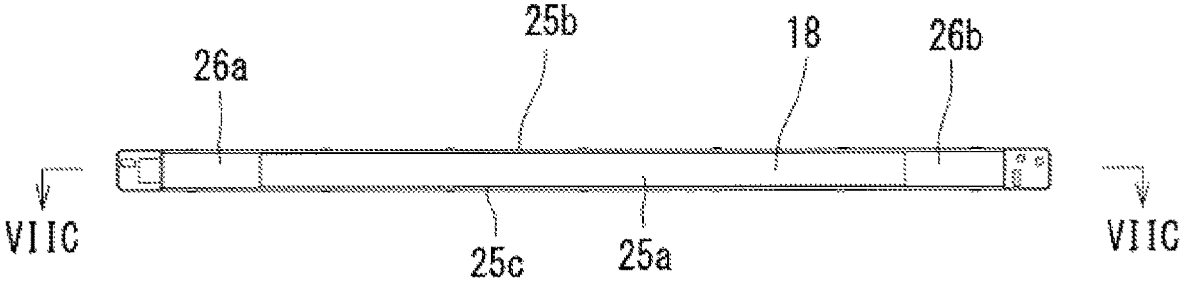
FIG. 7B is a front view of the fixing pad according to yet another embodiment of the present disclosure, with a surface parallel to a nip portion N forming a gap as the front.
Figure 7C:
FIG. 7C is a view along arrow VIIC-VIIC in FIG. 7B.

Next, yet another embodiment of the present disclosure will be described. FIG. 7A to FIG. 7C are diagrams showing a fixing pad 25 of a fixing device 10 according to yet another embodiment of the present disclosure, and are diagrams that correspond to FIG. 6A to FIG. 6C of the previous embodiment. FIG. 7A is a perspective view of the fixing pad 25. FIG. 7B is a front view with a surface 25*a*, which is parallel to a nip portion N that forms a gap, of the fixing pad 25 as the front. FIG. 7C is a view along arrow VIIC-VIIC in FIG. 7B. Referring to FIG. 7A to FIG. 7C, in the present embodiment, the fixing pad 25 is a member having a letter-C shaped cross-section, and includes a surface 25*a* parallel to the nip portion N, and protrusions 25*b* and 25*c* at the upper end and lower end of the surface 25*a* that protrude perpendicularly from the surface 25*a*. This shape is the same as in the embodiment described using FIG. 4A and the like.

The difference between the present embodiment and the embodiment shown in FIG. 4A and the like is that, in the present embodiment, the surface 25*a* is only provided at the center of the fixing pad 25 in the longitudinal direction, and both ends of the fixing pad 25 in the longitudinal direction are provided with flat protrusions 26*a* and 26*b* having the same height as the protrusions 25*b* and 25*c*.

That is, the protrusions 25*b* and 25*c*, and the protrusions 26*a* and 26*b*, at which the fixing pad 25 and the pad heat transfer plate 13 make contact, are provided on the outer periphery of the fixing pad 25. A gap 18 is provided at the center of the fixing pad 25 in the longitudinal direction. The ends in the longitudinal direction are not provided with the gap 18, and are provided with contact areas between the fixing pad 25 and the pad heat transfer plate 13. The gap 18 is only provided at the center of the width direction of the sheet of paper subjected to fixing, and both ends are not provided with the gap 18.

In other words, the width of the protrusions 26*a* and 26*b* arranged across a short-length direction, which is perpendicular to the longitudinal direction of the fixing pad 25, is wider than the width of the protrusions 25*b* and 25*c* arranged across the longitudinal direction of the fixing pad 25.

By adopting such a configuration, when a rise in the temperature occurs at the ends outside the paper feeding area due to a small paper size or the like, the area in which the fixing pad 25 and the pad heat transfer plate 13 make contact are secured on the end sides in the longitudinal direction. Therefore, it is possible to suppress an excessive rise in temperature at the ends of the sheet of paper.

As described above, according to the present disclosure, the fixing device is capable of suppressing and adjusting the amount of heat transferred from the pad heat transfer plate to the fixing pad without affecting the image quality. As a result, it is possible to provide a fixing device and an image forming device capable of reducing the power consumption.

The present disclosure can be implemented in various other forms without departing from the spirit or principal features of the present disclosure. Therefore, the embodiments described above are merely examples and should not be interpreted restrictively. All modifications and changes belonging to an equivalent scope of the claims of the present disclosure are within the scope of the present disclosure.

INDUSTRIAL APPLICABILITY

According to the present disclosure, the fixing device and the image forming device are capable of suppressing and adjusting the amount of heat transferred from the pad heat transfer plate to the fixing pad without affecting the image quality. Therefore, the fixing device and the image forming device are useful as devices capable of reducing the power consumption.

What is claimed is:

1. A fixing device comprising:
a heating rotator that is heated by a heat source;
a pressure rotator that makes contact with the heating rotator;
a pad member that sandwiches the heating rotator from an inner side of the heating rotator and is arranged opposing the pressure rotator, the pad member forming a nip portion between the heating rotator and the pressure rotator for holding and transporting a paper sheet;
a sliding member provided between the pad member and the heating rotator, which reduces a frictional force with the heating rotator; and
a heat transfer member provided between the sliding member and the pad member, the heat transfer member adjusting a heat transfer in a longitudinal direction of the heating rotator, wherein
the pad member is provided with (i) a surface that is parallel to the heat transfer member, and (ii) protrusions that protrude from the surface toward the heat transfer member,
the heat transfer member is provided with (i) a surface that is parallel to the pad member, and (ii) protrusions that protrude from the surface toward the pad member,
end parts of the protrusions of the pad member make contact with the surface of the heat transfer member, which is parallel to the pad member, so that a gap is formed that is surrounded by:
the surface of the pad member and the surface of the heat transfer member that are parallel to each other; and
the protrusions of the pad member,
the protrusions of the pad member are provided on an outer periphery of the pad member, and
a width in a longitudinal direction of a protrusion arranged across a short-length direction of the pad member is wider than a width in a short-length direction of a protrusion arranged across a longitudinal direction of the pad member.

2. The fixing device according to claim 1, wherein
the protrusions of the pad member are formed in the longitudinal direction of the pad member with a shape along the heat transfer member, and the gap is also formed in the longitudinal direction of the pad member.

3. An image forming device comprising the fixing device according to claim 1.

4. A fixing device comprising:
a heating rotator that is heated by a heat source;
a pressure rotator that makes contact with the heating rotator;
a pad member that sandwiches the heating rotator from an inner side of the heating rotator and is arranged opposing the pressure rotator, the pad member forming a nip portion between the heating rotator and the pressure rotator for holding and transporting a paper sheet;
a sliding member provided between the pad member and the heating rotator, which reduces a frictional force with the heating rotator; and
a heat transfer member provided between the sliding member and the pad member, the heat transfer member adjusting a heat transfer in a longitudinal direction of the heating rotator, wherein
the pad member is provided with (i) a surface that is parallel to the heat transfer member, and (ii) protrusions that protrude from the surface toward the heat transfer member,
the heat transfer member is provided with (i) a surface that is parallel to the pad member, and (ii) protrusions that protrude from the surface toward the pad member,
among the protrusions of the pad member, parts of the protrusions are located so as to make contact with the protrusions of the heat transfer member, and remaining parts of the protrusions are located so as not to make contact with the protrusions of the heat transfer member,
a gap is formed between the surface of the pad member and the surface of the heat transfer member that are parallel to each other,
the protrusions of the pad member are provided on an outer periphery of the pad member, and
a width in a longitudinal direction of a protrusion arranged across a short-length direction of the pad member is wider than a width in the short-length direction of a protrusion arranged across the longitudinal direction of the pad member.

* * * * *